United States Patent Office 3,443,411
Patented May 13, 1969

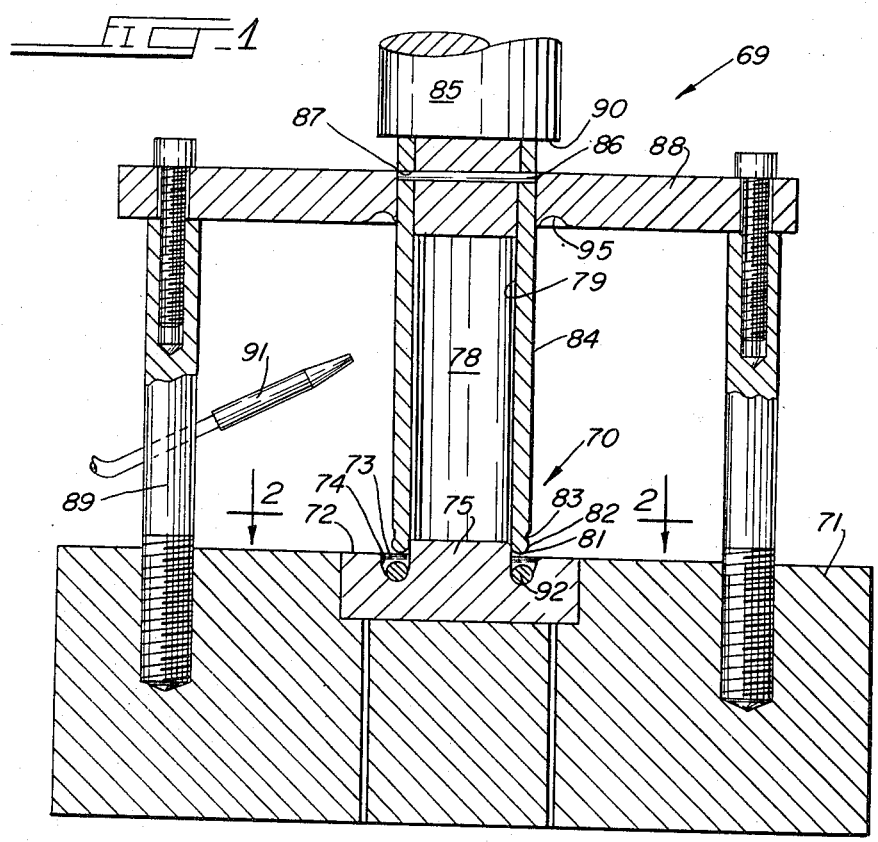
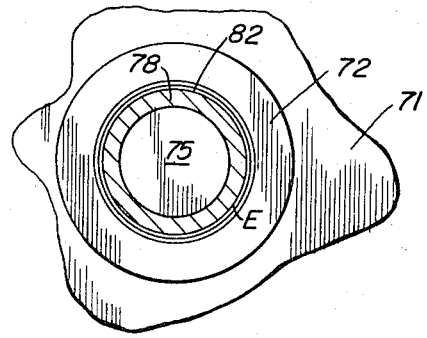

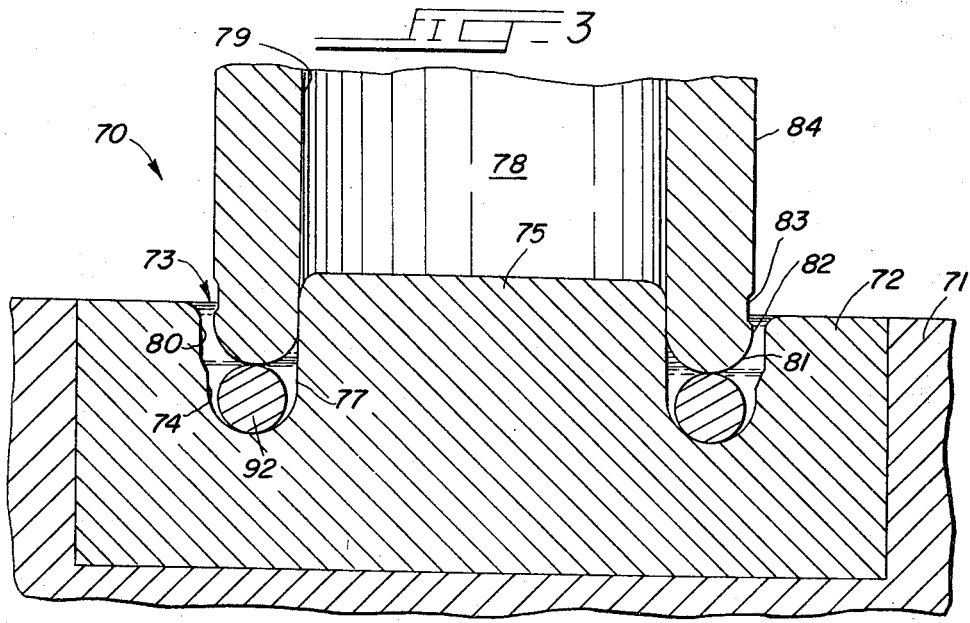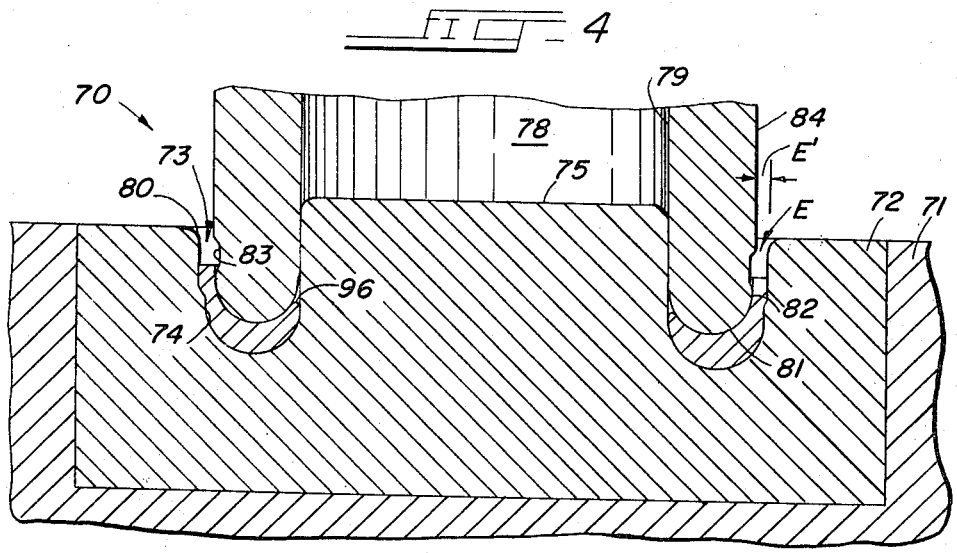

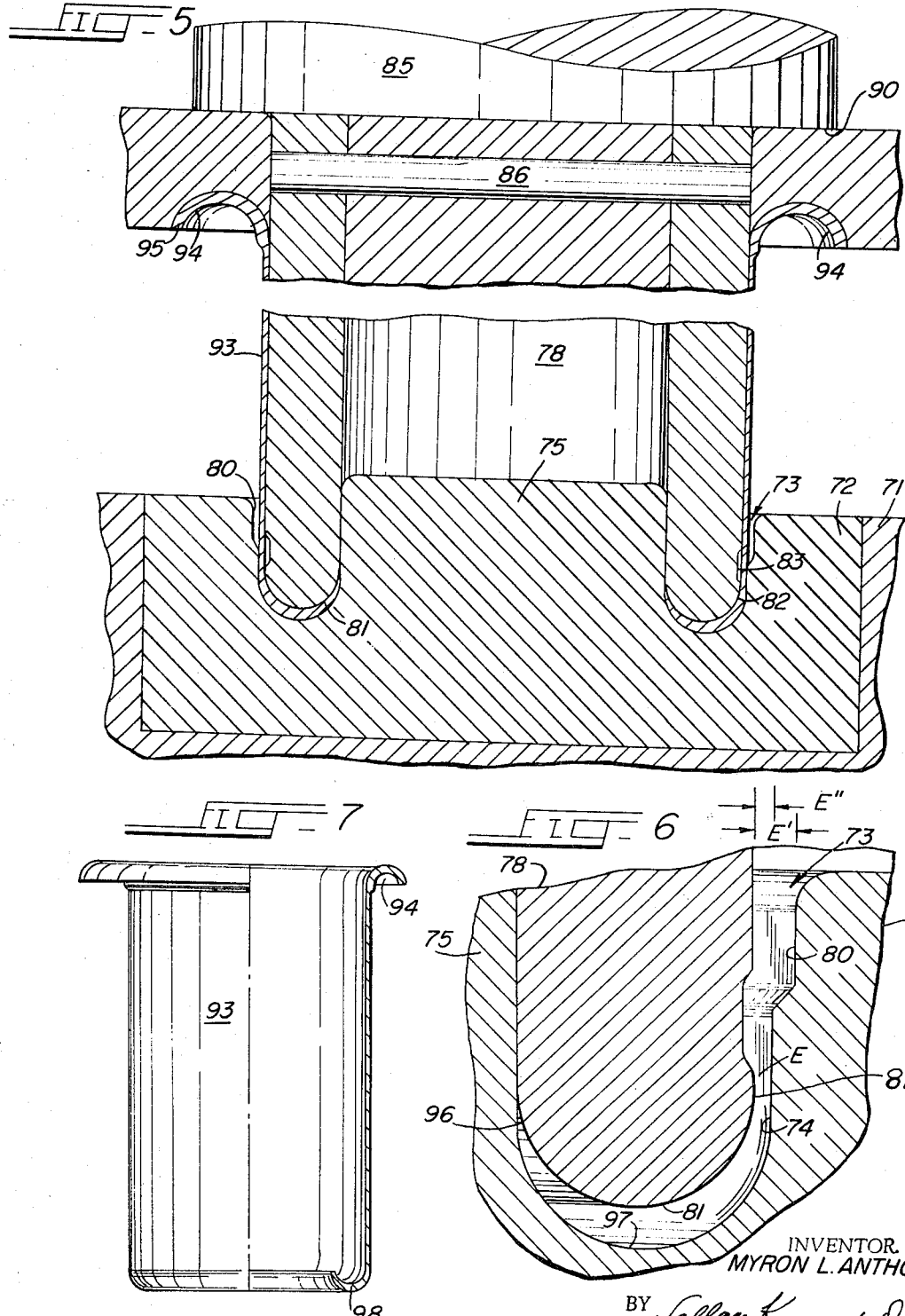

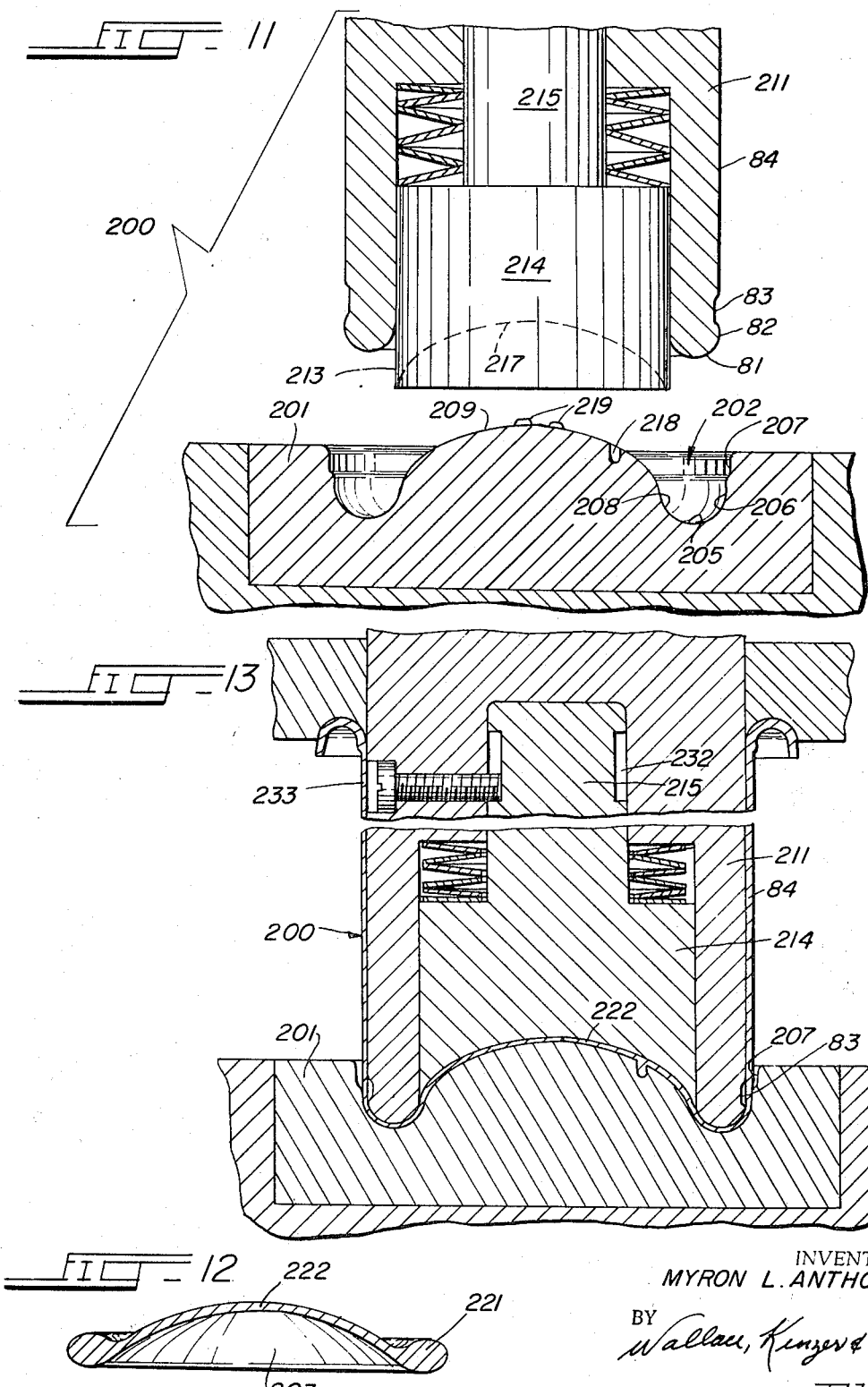

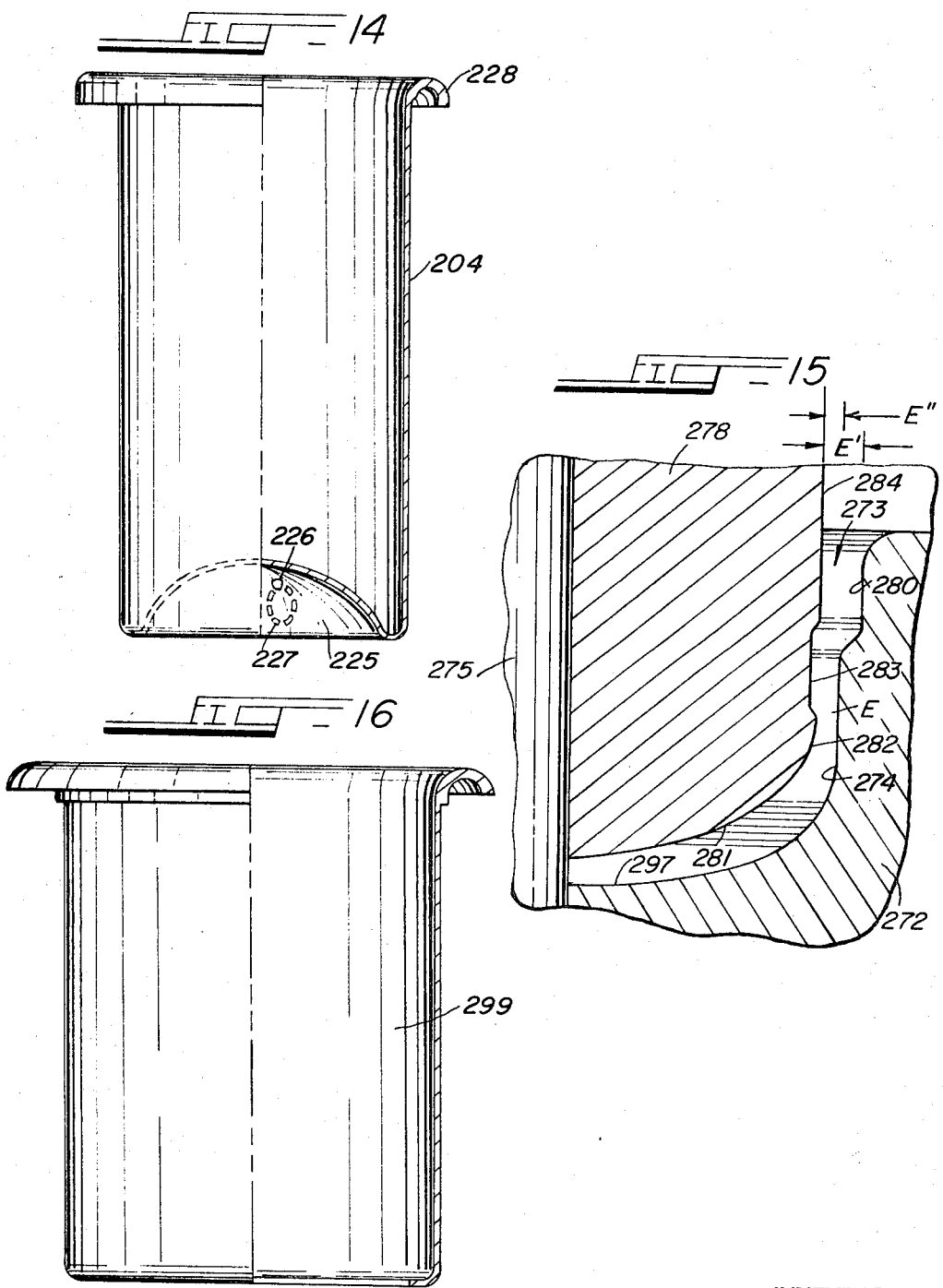

3,443,411
METHOD AND APPARATUS FOR EXTRUSION FORMING OF CYLINDRICAL METAL CONTAINERS
Myron L. Anthony, La Grange, Ill., assignor of twenty-three and seventy-five hundredths percent to George W. Butler and Gladys A. Butler, trustees under George W. Butler's trust agreement dated July 19, 1966, twenty-three and seventy-five hundredths percent to Gladys A. Butler and George W. Butler, trustees under Gladys A. Butler's trust agreement dated July 19, 1966, and five percent each to Thomas E. Dorn, and Norman F. Klocker
Filed Jan. 19, 1967, Ser. No. 610,377
Int. Cl. B21c 23/18, 35/00
U.S. Cl. 72—267       21 Claims

ABSTRACT OF THE DISCLOSURE

*Method.*—A method for extrusion-forming a thin-wall cylindrical metal can body of predetermined cross-sectional configuration and dimensions in which a ductile metal blank of ring-like configuration is extruded through an annular extrusion orifice formed between two annular mating die members, the die members being continuously guided, during extrusion, at a point immediately adjacent to but radially displaced from, the extrusion orifice. The flow path for the ductile metal is divergent toward the extrusion orifice.

*Apparatus.*—An extrusion apparatus for extrusion-forming of a thin-wall cylindrical metal can body from a ring-like ductile metal blank, including two relatively movable annular mating die members for extruding the metal of the blank through an annular extrusion orifice formed between two adjacent extrusion walls of the die members; the two die members are maintained in accurate alignment with each other by direct interfitting contact between two guide walls of the die members that are immediately adjacent to but radially displaced from the extrusion orifice. The configuration of the die members is such that the flow path for the ductile metal, along the die surfaces, is a divergent path and preferably a curved divergent path. A relief channel is provided in the extrusion wall of one die member, immediately beyond the extrusion orifice, to limit the axial length of the orifice and to relieve friction drag while maintaining continuous control of the extruded can body. One of the extrusion walls may be of stepped configuration to afford a thick flange on the extruded can body. The metal blank may have a thin membrane across its center, for a two-piece can construction; this membrane fits between mating conical or spherical guide surfaces on two parts of one of the die members.

Background of the invention

A familiar package utilized for a variety of goods is the conventional "tin can," which is actually fabricated from thin-gauge sheet steel that has been plated with tin or otherwise provided with a protective coating. With respect to some goods, however, and particularly fruit juices, beer, and other beverages, the conventional tinplate can has been and is being replaced by aluminum containers generally similar in basic construction to the tinplate can. Fabricating methods and apparatus for the manufacture of these aluminum containers, however, have not been entirely satisfactory. In particular, considerable difficulty has been encountered in producing container bodies having walls thin enough to permit effective competition of the aluminum can with the tinplate can. In general, aluminum is more expensive than tinplate and it is usually necessary to reduce the total quantity of metal in the aluminum can in order to achieve a directly competitive situation.

One known method of manufacturing aluminum can bodies entails deep drawing of a disc-like aluminum blank to form a container body of cylindrical configuration having one closed end. With conventional drawing or impact extrusion apparatus, substantial difficulty is encountered in maintaining uniform wall thickness. As a result, it is usually necessary to provide for a heavier wall than would otherwise be desirable, in order to compensate for variations in the wall thickness. In addition, conventional impact extrusion or drawing apparatus requires the use of extremely high pressures, working near the limit of strength of available tooling. The fabrication of these cans generally entails considerable waste with an attendant increase in cost. In some cases, relatively expensive sheet aluminum is used as the starting material.

Summary of the invention

This invention relates to a new and improved extrusion apparatus and method for fabricating a thin-wall cylindrical metal body from aluminum or other ductile metal in a single unified operation. The invention is particularly advantageous as applied to the manufacture of aluminum cans, but other materials such as copper, brass, or even mild steel may be utilized where desired.

It is a principal object of the present invention, therefore, to provide a new and improved extrusion apparatus and method, for fabricating thin-wall cylindrical metal can bodies of aluminum or other ductile metal, that effectively and inherently eliminates or minimizes the difficulties and problems encountered in previously known apparatus of this general kind.

A specific object of the invention is to provide a new and improved extrusion apparatus for fabricating a cylindrical metal body from an inexpensive ring-like ductile metal blank. The blank may be completely open in the center or may have a thin membrane across its central portion; in the latter instance, most of the metal of the blank is in the annular rim.

A particular object of the invention is to provide a new and improved extrusion apparatus and method for fabricating cylindrical metal bodies from a ductile metal, such as aluminum, copper, or even mild steel, having a uniform wall thickness and requiring a minimum amount of metal with little or no waste. In particular, it is an object of the invention to provide an extrusion method and apparatus that inherently eliminates any requirement for a thick bottom in the completed container or other cylindrical metal body.

A further object of the invention is to provide a new and improved extrusion apparatus for fabricating a one-piece integral cylindrical container body or the like of ductile metal that includes a central cylinder portion having thin walls but provided at the opposite ends with relatively thick beads or flanges appropriate for crimp sealing of lids or other closure members on the opposite ends of the cylinder.

Another object of the invention is to reduce tool wear in an impact extrusion apparatus capable of fabricating cylindrical metal bodies from ring-like ductile metal blanks. Achievement of this objective is effected in part by the utilization of a guiding system for the extrusion dies that continuously maintains the dies in accurately aligned relation to each other and in part by the selection of the die configuration and blank configuration to enable completion of the extrusion operation at relatively low pressures as compared with previously known apparatus.

A further object of the invention is to provide a new and improved extrusion apparatus for forming a one-piece cylindrical container body having one end closure that is integral with the container body yet which does not require that the integral end closure be substantially thicker than the container body wall.

A specific object of the invention is to provide a new and improved extrusion method and apparatus adaptable to the fabrication of cylindrical metal bodies for beverage containers and like applications of any reasonable external configuration, including round, oval, rectangular, and other configurations..

Extrusion apparatus constructed in accordance with the invention, for fabricating a cylindrical metal container body from a ring-like ductile metal blank, comprises a first die member having a ring-like die cavity for receiving the metal blank and a second die member aligned with the first die member. The second die member comprises a plunger movable into the aforesaid die cavity to compress the blank and extrude the metal of the blank through a ring-like extrusion orifice of extremely short axial length defined conjointly by one wall of the die cavity and by the adjacent wall of the plunger. This extrusion orifice determines the cross-sectional configuration and dimensions for the cylindrical metal body being fabricated. There are first and second guide elements on the first and second die members, respectively, for guiding the die members in their movement relative to each other; these guide elements constitute walls of the die members that engage each other, in close interfitting relation, at a point radially displaced from but axially aligned with the extrusion orifice, engagement being maintained throughout the axial movement of the plunger into the die cavity. The configuration of the die members is such that the flow path for the ductile metal is substantially continuously divergent from the guide elements toward the extrusion orifice.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

*Description of the drawings*

FIG. 1 is a vertical section view of an extrusion press for fabricating cylindrical can or container bodies of ductile metal, including die members constructed in accordance with one embodiment of the present invention;

FIG. 2 is a sectional view taken approximately along line 2—2 in FIG. 1;

FIG. 3 is a detail sectional view of the die members of FIG. 1 at the very beginning of the extrusion operation;

FIG. 4 is a sectional view similar to FIG. 3 illustrating an intermediate stage in the extrusion process;

FIG. 5 is a detail sectional view similar to FIGS. 3 and 4 with the die members illustrated at the position reached upon completion of the extrusion operation;

FIG. 6 is an enlarged-scale detail view, in cross-section, of a part of the mating die members of FIGS. 1–5, illustrated in full closed position but with no can blank present;

FIG. 7 is an elevation view, partly in cross-section, of a cylindrical can body fabricated with the apparatus of FIGS. 1–6;

FIG. 11 is a detail sectional view of a set of extrusion dies constructed in accordance with another embodiment of the invention, showing the dies in open position;

FIG. 12 is a detail sectional view of a ductile metal blank for use in the dies of FIG. 11;

FIG. 13 is a sectional elevation view of the dies of FIG. 11 at the final closed position for the extrusion operation;

FIG. 14 is a sectional elevation view of a cylindrical can body formed in the die set of FIGS. 11–13;

FIG. 15 is a detail sectional view, like FIG. 6, of another die configuration; and FIG. 16 is an elevation view, partly in cross-section, of a can body formed with dies as illustrated in FIG. 15.

*Description of the preferred embodiments*

Figure 8:
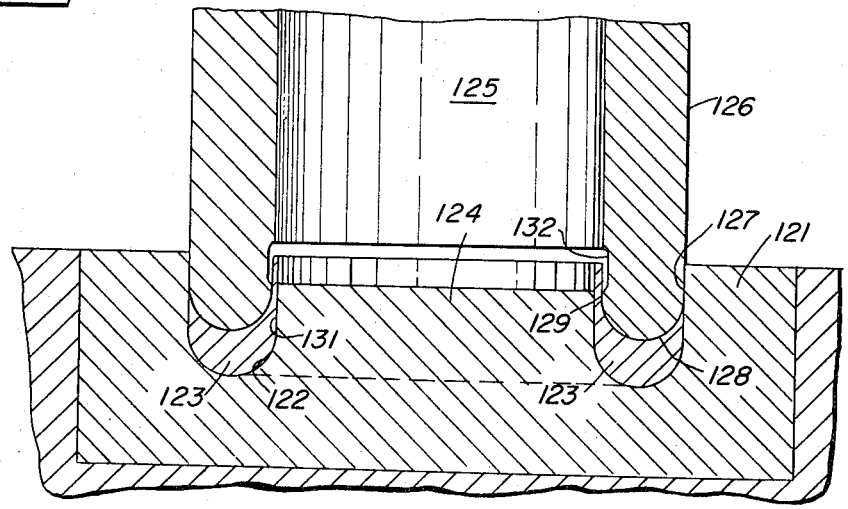
FIG. 8 is a detail sectional elevation view, similar to FIG. 4, illustrating die members constructed in accordance with another embodiment of the present invention and positioned at an intermediate stage in the extrusion operation.

Throughout this specification and in the appended claims the terms "cylinder" and "cylindrical" are employed in the general sense as referring to a configuration generated by movement of a straight line in a closed path about a parallel straight line axis; thus, these terms include cylinders of generally rectangular, square, elliptical, and other cross-sectional configurations as well as the usual cylinders of circular cross-section. In the apparatus embodiments of the invention illustrated in the drawings, the extrusion apparatus is shown as having a generally circular configuration, and this is also true with respect to the metal bodies produced by the extrusion apparatus, but it should be understood that modification to other cross-sectional configurations can be readily accomplished. Similarly, references to ring-like or annular metal blanks and die cavities are intended to include closed configurations of rectangular, square, elliptical and other shapes as well as circular shapes. Moreover, in some instances the ring-like blanks employed have their central areas closed by a thin metal wall or membrane, as discussed more fully hereinafter.

FIG. 1 is a sectional elevation view of an extrusion press 69 in which an extrusion apparatus 70 constructed in accordance with one embodiment of the present invention is incorporated. Press 69 comprises a steel base member or bolster 71 having a central die insert cavity within which a first die member 72, comprising a carbide tool insert, is mounted. Die member 72 is provided with a central ring-like die cavity 73 having an external cavity wall 74 (see FIGS. 3–6). The upper portion 80 of cavity wall 74 is of somewhat larger diameter than the lower portion thereof. A fixed guide element 75 comprising an integral part of die member 72 projects upwardly from the center of the die cavity 73.

Extrusion apparatus 70 further includes a second die member 78. The second die member is a cylindrical plunger having a central axial opening with an internal wall 79 that is close fitting around guide element 75. The lower end of plunger 78 includes a transition surface 81 extending outwardly from the internal wall 79 of the plunger and terminating at a short axially extending extrusion surface 82. Immediately above extrusion surface 82 there is a relief groove 83 that extends axially of the plunger die 78 for a short distance, approximately equal to the height of the smaller-diameter portion of die cavity wall 74. Above relief groove 83, the external wall 84 of plunger die member 78 is constructed to afford an outside diameter approximately equal or even very slightly larger than the external diameter of the extrusion surface 82.

The upper end of plunger die member 78 is mounted upon a press ram 85 by suitable means such as a dowel pin 86. The assembled ram structure extends downwardly through the central aperture 87 in a stripper plate 88. Stripper plate 88 is mounted upon suitable supports such as the posts 89 affixed to bolster 71. The lower surface 90 of ram 85 extends outwardly of die member 78 to afford a stop surface for limiting downward movement of the ram. Press 69 is further provided with ejecting means, which in this instance comprises a nozzle 91 connected to a suitable supply of compressed air (not shown).

FIG. 2 illustrates the interrelation between die members 72 and 78 and their respective guide elements 75 and 79. As shown therein, the internal wall 79 of die member 78, which is the guide element for this die member, fits tightly around the central guide element 75 of die member 72. The external extrusion surface 82 of die member 78 and the peripheral surface 74 of die cavity 73 conjointly define the annular extrusion orifice E through which the cylindrical metal body is to be extruded.

FIGS. 1, 3, 4 and 5 illustrate a virtually complete sequence of operations for a full cycle of the extrusion apparatus 70. At the outset, press ram 85 is lifted from the position shown in FIG. 1 to a point at which transition surface 81 is well above the top of guide element 75. A ring-like ductile metal blank such as the aluminum ring 92 is dropped over guide pin 75 and comes to rest in die cavity 73 as shown in FIG. 1. Press ram 85 is then started on a downward stroke to initiate the extrusion operation.

The next stage in the extrusion cycle is shown in FIG. 3, in which plunger die member 78 is advanced to bring transition surface 81 into pressure contact with the ductile metal blank 92 in die cavity 73. Continued downward movement of die member 78 coins the metal of blank 92 into conformity with the die cavity 73 and begins extrusion of the metal upwardly around the exterior surface of the plunger die and through the extrusion orifice E defined conjointly by the two die members.

FIG. 4 shows the extrusion operation at a more advanced stage with an appreciable portion of the ductile metal forced outwardly and upwardly of the die cavity, though still short of the upper external surface 84 of plunger die member 78. The final limit of the extrusion stroke for die member 78 is shown in FIG. 5, the metal having been extruded from the die cavity to the full height desired for the metal container body or other cylindrical body, identified in this view by reference numeral 93.

During the relatively early portion of the extrusion operation, as shown in FIG. 4, the width of the extrusion orifice E is determined by the spacing E' between the extrusion surface 82 on the plunger die and the upper wall 80 of the die cavity. This provides for the formation of a rather thick flange 94 on the upper rim portion of the can body 93. The initial stage of formation of this flange is shown in FIG. 4; the completed flange 94 is illustrated in FIG. 5.

As the plunger die member 78 advances into die cavity 73, the extrusion surface 82 enters the narrower lower part of the die cavity. This reduces the effective width of the extrusion orifice to the smaller spacing E''; the comparative relation between orifice widths E' and E'' is best illustrated in FIG. 6. The central portion of the wall of can body 93 has a thickness determined by the narrower width E' of the extrusion orifice E.

During the final stage of the extrusion operation, the upper rim of the can body 93, as it is formed, encounters stripper plate 88 (FIGS. 1 and 5). Stripper plate 88 is provided with an annular groove 95 that smooths or "irons" the flange 94 of the can body and that bends flange 94 outwardly, as the can body advances in formation, to the configuration shown in FIGS. 5 and 7. It is thus seen that the completed can body 93 (FIG. 7) has a thick outwardly curved flange 94 that is ready for crimp-sealing of an end closure (not shown) on the can. The added thickness of flange 94, as compared with the thin can wall, is quite advantageous in assuring adequate strength along the joint between the can body and the end closure.

The thickness of the can body wall, corresponding to orifice width E'', should be determined in accordance with the strength requirements of the can. In a small beverage can, the wall thickness may be of the order of 0.005 to 0.006 inch, and can be held to very close tolerances. Flange 94 may have a thickness of 0.012 to 0.015 inch. Of course, when containers having thicker walls are required, they are provided by appropriate dimensioning of die cavity 73 and extrusion surface 82.

Upon completion of the extrusion operation, ram 85 (FIG. 1) is actuated to pull the cylindrical plunger or pressure die member 78 upwardly through the aperture 87 in stripper plate 88. The stripper plate strips the cylindrical container body 93 from die member surface 84. When the ram 85 is elevated sufficiently to strip the can body from the plunger die, a blast of compressed air is released from nozzle 91 (FIG. 1), forcing the can body out of the way and readying press 69 for the next extrusion cycle.

During the complete extrusion cycle, the guide elements 75 and 79 of extrusion apparatus 70 are engaged in close interfitting relation. Moreover, a tight fit is maintained at the juncture between the guide elements that extends into die cavity 73 so that close uniformity can be maintained in the thickness of the container walls by maintaining the two die members in accurate nonmoving radial alignment with each other. There is no canting or other misalignment possible comparable to that frequently experienced where the guiding apparatus is remote from the extrusion orifice. The guide elements 75 and 79 are always engaged at a point radially displaced from but axially aligned with the extrusion orifice E, and engagement is maintained throughout the axial movement of plunger 78 into die cavity 73. That is, the guide walls 75 and 79 are always engaged in close interfitting relation immediately opposite the extrusion surface 82 that determines the instantaneous position of the extrusion orifice.

There is little tendency toward leakage of metal into the joint between guide elements 75 and 79 with the configuration and construction used for the die members in extrusion apparatus 70. During the extrusion operation, the downward movement of die member 78 does tend to force aluminum toward the juncture 96 between the guide pin 75 and the internal surface 79 of the plunger die member. This tendency, however, is offset by the pressure of the confined ductile metal acting radially inwardly on plunger die member 78 along transition surface 81 and extrusion surface 82. This radial inward force on member 78 forces the plunger die against guide element 75 with a force equal to the leakage pressure at juncture 96. That is, the pressure exerted by the extrusion operation forces die member 78 inwardly into a tighter fit with guide element 75 and eliminates leakage between these two members, which could otherwise lead to "freezing" of the die set.

The relief groove 83 in plunger die member 78 serves to limit the effective length of the extrusion orifice E to the axial length of extrusion surface 82. Thus, excessive back pressure at the extrusion orifice is eliminated. A minor frictional drag may be experienced along the upper portion 84 of plunger die member 78, but this drag is negligible as compared with the overall pressure requirements for extrusion of the metal. Indeed, a minor enlargement in the upper portion 84 of the die member 78, of the order of 0.001 inch, may be utilized to retain the completed can body on the plunger die member until stripped off by stripper plate 88, assuring prompt and effective removal of the can body from the press and accelerating the overall press cycle.

It is important that extrusion surface 82 be kept to a short axial length in order to hold the extrusion resistance to reasonable levels and to keep the required extrusion pressure to a minimum. The axial length of the extrusion surface, in a typical die set, may be of the order of 0.015 inch. The depth of the relief groove 83 need not be particularly large. In fact, a relief of as little as 0.001 inch is quite practical and effective and aids materially in reducing the total pressure required for the extrusion operation.

Another important factor in reduction of the extrusion pressure requirements is the configuration of the opposed die member surfaces 81 and 97 (FIG. 6). These die member surfaces should have a configuration such that most of the flow path for the extruded metal, from the point 96 toward the extrusion orifice E, is continuously divergent, narrowing down again only near the orifice. A divergent configuration materially aids the metal flow and reduces pressure requirements. Curved surfaces, as shown in FIGS. 1 and 3–6, particularly FIG. 6, are quite suitable; other surface geometry can be employed as described hereinafter in connection with FIG. 15. In any die set constructed in accordance with the invention, the die surfaces should be smooth; abrupt transitions and corners should be avoided at all points below relief groove 83.

There is a practical limit to the downward movement of die plunger 78 into die cavity 73, imposed by the strength of the dies and the flow resistance of the ductile metal. In fact, it is virtually impossible to close the die set to an extent sufficient to force all of the ductile metal out from under the die surface 81. But this is no disadvantage, in manufacturing can bodies; it can be and is used to positive advantages.

Thus, in forming can 93 the downward movement of plunger die 78 is halted in the position shown in FIGS. 5 and 6, with the transition surface 81 spaced from the bottom surface 97 of the die cavity 73 by an average distance substantially greater than the minmum width E" of the extrusion orifice. The result is the formation of a relatively thick sealing flange 98 on the end of can body 93 opposite flange 94. Thus, each end of the can body 93 provides a thick flange for forming a strong crimp seal or other seal to an appropriate end closure member. Flange 98 is not of uniform thickness, but this does not detract from its usefulness as a sealing flange, nor does it weaken the completed can. Of course, the thickness of flange 98 should not be great enough to cause any substantial waste of metal. Typically, the minimum thickness for flange 98 may be approximately the same as the thickness of the other flange 94.

Figure 9:
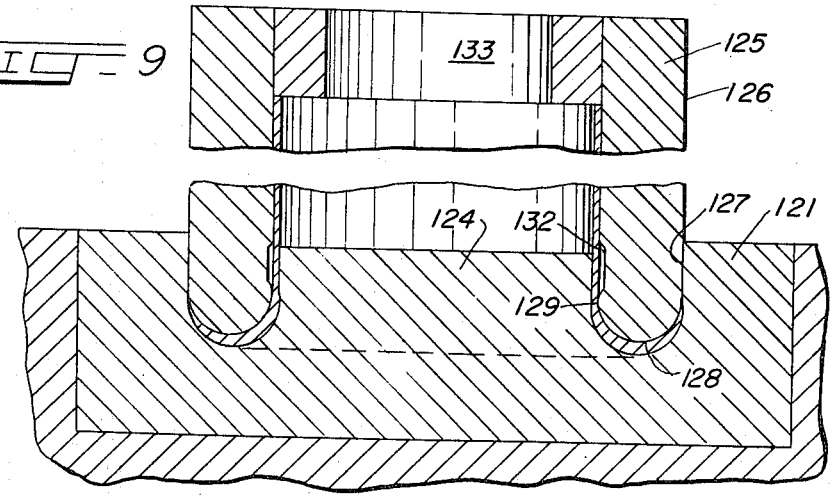
FIG. 9 is a detail sectional view showing the die members of FIG. 8 at the final closed position.

FIGS. 8 and 9 illustrate another embodiment of the present invention comprising an extrusion apparatus 120. Extrusion apparatus 120 comprises a first die member 121 having a ring-like die cavity 122 for receiving an annular ductile metal blank. The ductile metal blank may comprise a closed loop of aluminum, copper, or mild steel wire, or it may be a ring casting. The central portion of the die cavity 122 is somewhat different from the previously described embodiments, comprising an upwardly projecting die element 124, the upper surface of which is located below the top surface of the external portion of die 121.

Extrusion apparatus 120 further includes a second die member 125 comprising a cylindrical plunger. The outside diameter of plunger 125 is made approximately equal to the outside diameter of die cavity 122 so that the external surface 126 of the plunger and the peripheral surface 127 of the die cavity engage each other in close interfitting relationship when the plunger is driven downwardly into the die cavity. Thus, in this embodiment of the invention the surfaces 126 and 127 of the two die members afford the requisite guide elements for accurately guiding the die members in a continuous manner and at a point radially opposite the extrusion orifice of the dieset. Indeed, plunger die 125 is continuously guided all of the way into the die cavity by the die cavity wall 127.

The lower portion of plunger die 125 is provided with a transition surface 128 that extends from the external guide surface 126 inwardly to a short extrusion wall 129. The internal diameter of extrusion wall 129 is slightly smaller than the diameter of the external wall 131 of the projection 124 within die 121, the difference in diameters determining the thickness of the wall of the metal container body produced by the extrusion apparatus. That is, the extrusion orifice for this embodiment of the invention is defined by the adjacent walls 129 and 131 of the die members 126 and 121 respectively.

As before, the extrusion orifice wall 129 of plunger die 125 is quite short in axial length. The effective axial length of this wall may be of the order of 0.015 inch. Above the extrusion wall there is a relief groove 132 having an axial length sufficient to extend above the top of projection 124 in die member 121 when the two die members are completely closed with respect to each other; see FIG. 9. Thus, the total axial length of the extrusion orifice is again limited to a minor fraction of the height of the die cavity, reducing the total pressure required for the extrusion operation. An internal sleeve 133 may be mounted within the cylindrical plunger 125 in the upper end thereof.

At the beginning of the extrusion operation, a ringlike ductile metal blank is deposited in die cavity 122. Plunger die member 125 is then driven into the die cavity 122.

Figure 10:
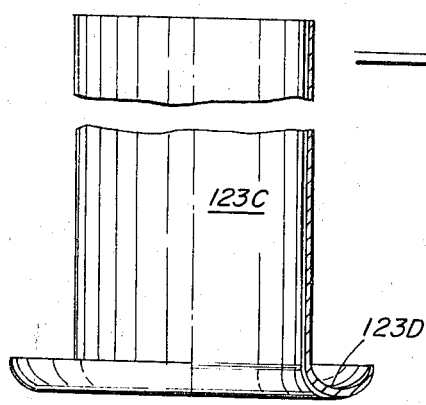
FIG. 10 is a partly sectional elevation view of a cylindrical can body formed by extrusion with the die members of FIGS. 8 and 9.

Initially, the ductile metal blank within the die cavity is coined into conformity with the die cavity, as shown by the deformed metal blank 123, FIG. 8. Thereafter, continued downward movement of the plunger die extrudes the metal of the blank upwardly through the narrow extrusion orifice comprising the gap between die walls 129 and 131. The continuing downward movement of the plunger die terminates as shown in FIG. 9 with most of the metal extruded from the die cavity and with the complete cylindrical container body 123C (FIG. 10) formed by the extrusion operation. The die configuration and the stroke of the plunger are preferably selected to afford a relatively thick flange on the bottom of the container body, as illustrated by flange 123D.

By proper determination of the volume of metal as initially placed in the die cavity, the extrusion operation can be regulated so that the upper rim of container body 123C engages the lower surface of sleeve 133 (FIG. 9) at the completion of the extrusion operation. This tends to coin or "iron" the upper edge of the container body and smooths out minor irregularities in the rim of the metal cylinder. If sleeve 133 is movably mounted relative to plunger die 125, the sleeve can subsequently be used as a stripper element to expel the container body 123C from the interior of the plunger die after the plunger die has been withdrawn from die cavity 122.

Extrusion apparatus 120, FIGS. 8, 9, may be readily modified to form a thick upper rim on the completed container body by affording a step in the central projection 124 of die 121, like the stepped portion of the die cavity in the die set of FIGS. 1–6.

FIG. 11 illustrates another extrusion apparatus 200 constructed in accordance with yet another embodiment of the invention. The ductile metal blank to be used in the extrusion apparatus 200 is the blank 203 shown in cross-section in FIG. 12. FIG. 13 shows the extrusion apparatus 200 in closed position at the end of an extrusion operation, and the container body formed by the apparatus 200 is the can 204 illustrated in FIG. 14.

The extrusion apparatus 200 of FIG. 11 comprises a dieset including a cavity die member 201 having an annular or ring-like die cavity 202. The bottom wall of cavity 202 is of curved configuration, as seen in cross-section; the configuration of the wall 205 may correspond to a circular arc. The peripheral wall 206 of die cavity 202 is of stepped configuration, the upper portion 207 of the die cavity wall being of enlarged diameter as compared with the lower portion of the wall. In this respect, the configuration of the external wall for die cavity 202 is essentially the same as the configuration for die cavity 73 illustrated in FIGS. 3–6.

But the central portion of die member 201, including the internal wall 208 of die cavity 202, is different from the configuration shown in the initial embodiment of the invention. The internal die cavity wall 208 merges smoothly into a dome-shaped central die surface 209. The central surface 209 may constitute a true hemisphere or merely a smaller section of a sphere. Alternatively, the die surface 209 of die member 201 may be of conical configuration.

Extrusion apparatus 200 further includes a plunger die member 211 that is generally similar in configuration to the plunger die member 78 of FIGS. 1–6. Thus, the plunger die in the apparatus of FIGS. 11 and 13 has a lower transition surface 81 that merges smoothly into a short extrusion wall 82, the upper edge of extrusion wall 82 being defined by a relief groove 83. The upper wall 84 of the die may again be of approximately the same diameter as the extrusion wall 82.

In the extrusion apparatus 200, however, the second or plunger die 211 does not fit directly on a fixed part of the cavity die member 201. Instead, the plunger die member 211 is provided with a central aperture having an internal guide wall 212 that engages in tight interfitting relation with the external surface 213 of an auxiliary die member 214. The auxiliary die member 214 may be provided with an auxiliary shaft 215 guided in an auxiliary central opening the plunger die 211. The shaft 215 is not used for guiding movement of the members 211 and 214 relative to each other. Rather, it serves as a central guide for a plurality of Belleville washers 216 disposed in the annular space 231 between plunger die member 211 and the upper surface of auxiliary die member 214. The Belleville washers 216 are used to drive auxiliary die member 214 from a recessed position within the plunger die 211, as illustrated in FIG. 13, to a projecting position as shown in FIG. 11. The purpose of relative movement between the members 211 and 214 is described hereinafter. Shaft 215 may be provided with a recess 232 for receiving a retainer screw 233 mounted in die member 211; the retainer screw prevents auxiliary die member 215 from dropping out of the plunger die.

The lower surface of auxiliary die member 214 is provided with an internal cavity 217 that is complementary in configuration to the central die surface 209 of cavity die member 201. Thus, if die surface 209 is of true hemispherical configuration, cavity 219 is constructed to be of concave hemispherical configuration with the same radius as surface 209. By the same token, if surface 209 is constructed as a conical segment, then cavity 217 is constructed of conical configuration with dimensions corresponding to die surface 209. However, die surface 209 may be provided with an indentation 218 and with one or more small projections 219 for a purpose described hereinafter.

The ductile metal blank 203 (FIG. 12) for use in the dieset 200 of FIGS. 11 and 13 is somewhat different from the metal rings used in the previously described embodiments of the invention. In general, blank 203 is of ring-like configuration, comprising a thick annular rim 221 of aluminum, copper, mild steel, or other relatively ductile metal. But the central portion of the annulus is not completely open. Instead, a thin wall or membrane 222 extends across the thick annular rim of the metal blank. Preferably, membrane 222 is coined or otherwise preformed to conform generally to the curvature of the die surface 209 (FIG. 11). The correspondence need not be exact, but should be close enough so that the metal blank can be easily centered on the cavity die 201 with the membrane 222 extending across die surface 209 and with the rim portion 221 of the metal blank located within die cavity 202.

In operation of the extrusion apparatus 200, the plunger die 211 and the auxiliary die 214 are moved to a position well above the cavity die 201 with the auxiliary die 214 projecting from the plunger die as shown in FIG. 11. A ductile metal blank 203 is then deposited in the cavity die with the central membrane 222 of the blank resting upon die surface 209 and with the thick rim portion 222 of the blank located in the die cavity 202.

When the ductile metal blank is in position in the die cavity, the plunger die assembly comprising auxiliary die member 214 and plunger die 211 is moved downwardly, bringing the auxiliary die member 214 into engagement with the central membrane portion 222 of the metal blank 203. The auxiliary die member 214 forces the thin central portion 222 of the ductile metal blank into full conformity with the die surface 209 of the cavity die 201. Preferably, enough force is applied to extrude some of the metal of the ductile metal blank into the small cavity 218 of die 201, forming a strong integral rivet for a self-opening can closure. One or more thin ridges 219 on the die surface 209 of the cavity die score the central membrane 222 of the ductile metal blank to provide an effective self-opening construction for the completed can. Ridges 219 can be located on the internal surface 217 of auxiliary die member 214, if preferred.

The auxiliary die member 214, as it moves downwardly, cannot become laterally offset with respect to the cavity die 201 if a hemispherical or conical surface is used for die surface 209 and cavity 217 has the same configuration as surface 209. Consequently, the auxiliary die member 214 is effectively and accurately self-centering on surface 209 of cavity die 201. In effect, therefore, auxiliary die member 214, when fully seated, becomes a part of cavity die 201.

From this point onward, in the operation of extrusion apparatus 200, the procedure is as described above for the embodiment of FIGS. 1–6. That is, the plunger die 211 is driven downwardly, being accurately guided throughout its movement by the close interfitting engagement of its internal wall 212 with the external surface 213 of auxiliary die member 214. The metal from the thick rim 221 of the ductile blank 203 is forced upwardly around the transition surface 81 of the plunger die member 211 and past the extrusion orifice defined by the die surface 82 and the external peripheral surfaces of the die cavity 202. The positions of the die members at the end of the extrusion operation are illustrated in FIG. 13 and the configuration of the completed can 204 is shown in FIG. 14. Can 204 has a complete lower closure 225 with an anchoring post 226 for a self-opening construction, the closure 225 already being scored as indicated by reference numeral 227. The opposite end of the can includes a relatively thick flange 228 for effective crimp sealing or other sealing of a closure member to complete the can body.

FIG. 15 illustrates, in an enlarged sectional view similar to FIG. 6, an alternate configuration for the critical die surfaces of the extrusion apparatus of the present invention. The dieset 270 illustrated in FIG. 15 comprises a cavity die 272 having an annular cavity 273, the central portion of which is closed by a guide element 275. Die cavity 273 is of stepped configuration, the upper wall 280 of the die cavity having a larger diameter than the lower peripheral wall 274. Thus, a stepped orifice is again provided, the orifice having a transition from a maximum width E' to a minimum width E''.

The plunger die 278 for the extrusion apparatus 270 is generally similar to die member 78 described above in connection with FIGS. 1–6. The upper peripheral wall 284 of the plunger die terminates at a relief groove 283 which leads to an extrusion wall 282. The extrusion wall 282 is quite short in axial length and may, for example, be of the order of 0.015 inch.

The difference in extrusion apparatus 270, as compared with the apparatus 70 of the initial embodiment, is in the configuration of the transition wall 281 on the plunger die and the bottom wall 297 of the die cavity 273. Transition wall 281 is of curved configuration but does not curve back upwardly toward the external surface of the central guide pin 275. A corresponding configuration is employed for the bottom wall 297 of the die cavity. Again, the two walls 297 and 281 are shaped so that the flow path of the metal from the portion of the die cavity adjacent guide element 275 toward the orifice E is continuously divergent until a point immediately adjacent the orifice. The resultant can configuration is illustrated by the can 299, FIG. 16.

In all of the embodiments of the invention described above, the cavity die member is assumed to be positioned at the bottom of the machine with the die cavity opening upwardly. It should be understood, however, that the relationship of the plunger and cavity dies can be reversed and the cavity die may be positioned over the plunger. Moreover, it is not essential that the plunger die be the movable element of the die combination; the plunger die, as referred to in the description of each of the embodiments above, can be stationary and the requisite movement of the plunger die into the cavity die can be effected by moving the cavity die onto the plunger. It will, of course, be apparent that a thickened end flange can be achieved on any of the embodiments of the extrusion apparatus; specifically, the embodiment of FIGS. 8 and 9 can be provided with a stepped die cavity to produce a thick sealing flange on the rim of the can if desired. Moreover, the specific die configuration of FIG. 15 can be readily employed in the die set of FIGS. 8 and 9.

I claim:

1. Extrusion apparatus for fabricating a cylindrical metal container body from a ring-like ductile metal blank comprising:
 a first die member having a ring-like die cavity for receiving said metal blank;
 a second die member aligned with said first die member and comprising a cylindrical plunger movable into said die cavity to compress said blank and extrude the metal of said blank through a ring-like extrusion orifice of short axial length defined conjointly by one wall of said die cavity and an adjacent extrusion wall of said plunger, said extrusion orifice determining the cross-sectional configuration and dimensions for said cylindrical metal body;
 and first and second guide elements on said first and second die members, respectively, for guiding said die members in their movement relative to each other, said guide elements engaging each other in close interfitting relation at a point radially displaced from but axially aligned with said extrusion orifice, engagement being maintained throughout the axial movement of said plunger into said die cavity;
 the configuration of said die members being such that the flow path for the ductile metal is substantially continuously divergent from said guide elements toward said extrusion orifice.

2. Extrusion apparatus for fabricating a cylindrical metal container body from a ring-like ductile metal blank, according to claim 1, in which said extrusion wall of said plunger has a shallow relief groove effectively limiting the axial length of said extrusion orifice to much less than the length of travel of said plunger into said die cavity.

3. Extrusion apparatus for fabricating a cylindrical metal container body, according to claim 2, in which said relief groove has an axial length of the same order of magnitude as the length of travel of said plunger into said die cavity.

4. Extrusion apparatus according to claim 1 in which said one wall of said die cavity is of stepped configuration, having an outer axial portion displaced from said extrusion wall of said plunger by a greater distance than the inner axial portion thereof, for forming a relatively thick flange on the extruded rim of said cylindrical metal body.

5. Extrusion apparatus according to claim 4, in which said one wall of said die cavity is the external peripheral wall of said die cavity and in which said extrusion wall of said plunger is the external peripheral wall of said plunger.

6. Extrusion apparatus according to claim 1 in which said one wall of said die cavity is the internal wall of said die cavity and in which said extrusion wall of said plunger is the internal wall thereof.

7. Extrusion apparatus according to claim 1, and further comprising stop means for limiting movement of said plunger into said die cavity to afford a relatively thick flange on the rim of said cylindrical metal body formed within said die cavity.

8. Extrusion apparatus according to claim 1, and further comprising an annular member disposed immediately adjacent to said plunger but displaced a substantial distance from said extrusion orifice, for engaging and smoothing the extruded rim of said cylindrical metal body during the terminal portion of the movement of said plunger into said die cavity.

9. Extrusion apparatus according to claim 8 in which said annular member is of concave configuration and bends the extruded rim of said cylindrical metal body away from said plunger.

10. Extrusion apparatus according to claim 8 in which said one wall of said die cavity is of stepped configuration, having an outer axial portion displaced from said extrusion wall of said plunger by a greater distance than the inner axial portion thereof, for forming a relatively thick flange on the extruded rim of said cylindrical metal body.

11. Extrusion apparatus according to claim 1, in which the bottom surface of said die cavity and the transition surface on said plunger, facing the bottom of said die cavity, are both smooth, continuously curved surfaces.

12. Extrusion apparatus according to claim 1 in which said first and second guide elements constitute integral walls of said first and second die members, respectively.

13. Extrusion apparatus for fabricating a cylindrical metal container body from a ring-like ductile metal blank comprising:
 first and second die members movable relative to each other along a predetermined axis and having two concentric pairs of walls aligned with each other and extending outwardly of an annular die cavity in one of said die members;
 one of said pairs of aligned walls engaging each other for continuous guiding movement of said die members;
 the other pair of said aligned walls being separated by a small distance defining an extrusion orifice of short axial length determining the cross sectional configuration and dimensions for a cylindrical metal body extruded through said orifice from a ductile metal blank disposed in said die cavity;
 the configuration of said die members being such that the flow path within said die cavity from said guide walls to said extrusion orifice is a smooth unbroken path without abrupt transistions and provides substantially equal pressures at the conjunction of each pair of walls.

14. Extrusion apparatus according to claim 13 in which one of said walls of the pair defining said extrusion orifice is of stepped configuration for forming a relatively thick flange on the extruded rim of the cylindrical metal body.

15. Extrusion apparatus for fabricating a cylindrical metal container body having one integral end closure wall from a ring-like ductile metal blank, the central portion of which is closed by an integral thin wall of the same metal, said apparatus comprising:
 a first die member having a ring-like die cavity for receiving said metal blank and having a convex die surface across the central portion of the cavity;
 an auxiliary die member having an external surface of configuration corresponding to the external wall of said die cavity and having a concave die recess of a configuration matching that of said central die surface of said first die member disposed in alignment with said die surface;

a second die member comprising a cylindrical plunger disposed in encompassing relation to said auxiliary die member in tight interfitting relation therewith but axially movable relative thereto;

means for moving said auxiliary die member into engagement with the central wall of a ductile metal blank disposed in said die cavity with sufficient force to coin the metal of said blank into conformity with said central die surface;

means for driving said second die member along said auxiliary die member into said die cavity to compress and extrude the metal of the rim portion of said blank outwardly of said cavity through a ring-like extrusion orifice defined conjointly by the external walls of said first and second die members to form the walls of the cylindrical metal container body;

the interfitting engagement between said auxiliary die member and said first die member continuously guiding and centering said first die member in relation to said die cavity throughout the axial movement of said plunger into said die cavity;

the configuration of said first and second die members being such that the flow path within said die cavity toward said extrusion orifice is a smooth unbroken path without abrupt transitions and provides substantially equal pressures at the extrusion orifice and at the conjunction of the walls of said second die member and said auxiliary die member.

16. Extrusion apparatus according to claim 15 in which the external wall of said plunger has a shallow relief groove limiting the effective axial length of the extrusion orifice and in which the central die surface of said first die member and the mating surface of said auxiliary die member are of partial spherical configuration.

17. Extrusion apparatus according to claim 15 in which the external wall of said plunger has a shallow relief groove limiting the effective axial length of the extrusion orifice and in which the central die surface of said first die member and the mating surface of said auxiliary die member are of truncated conical configuration.

18. Extrusion apparatus according to claim 15 in which the external wall of said die cavity is of stepped configuration for forming a relatively thick flange on the extruded rim of the cylindrical metal body.

19. Extrusion apparatus according to claim 15 in which said central die surface of said first die member is provided with a small cavity into which some of the metal of the central wall of said blank is forced, during coining thereof, to form a support for a self-opening closure in said integral end wall of said container body.

20. Extrusion apparatus according to claim 15 in which said convex die surface of said first die member is provided with at least one thin ridge for scoring the central portion of said integral end wall of said metal container body.

21. The method of fabricating a thin-wall cylindrical metal container body of predetermined cross sectional configuration comprising the following steps:

forming a blank, from ductile metal, of closed ring-like configuration generally similar to the cross-sectional configuration of said metal body but substantially thicker than said metal body, said flank having a total volume of ductile metal approximately equal to the volume of metal required for said metal body;

depositing said ductile metal blank in a ring-like die cavity in a first die member;

driving an annular second die member into said die cavity to extrude the metal of said blank through a ring-like extrusion orifice formed by the two die members, said orifice having a cross sectional configuration and dimensions corresponding to those required for said metal body; and continuously guiding said die members, relative to each other, during extrusion, at a point radially displaced from but axially aligned with said extrusion orifice.

References Cited

UNITED STATES PATENTS

| 1,480,843 | 1/1924 | Singer | 72—267 X |
| 2,104,222 | 1/1938 | Decker | 72—267 X |
| 2,748,464 | 6/1956 | Kaul | 72—256 |

FOREIGN PATENTS

| 1,047,136 | 7/1953 | France. |
| 430,949 | 6/1926 | Germany. |
| 672,815 | 3/1939 | Germany. |

MILTON S. MEHR, *Primary Examiner.*

U.S. Cl. X.R.

72—256, 257